US011340588B2

(12) United States Patent
Johnston et al.

(10) Patent No.: US 11,340,588 B2
(45) Date of Patent: May 24, 2022

(54) AUTOMATION CONTROL BASED ON A REFERENCE ARRAY

(71) Applicant: Rockwell Automation Technologies, Inc., Mayfield Heights, OH (US)

(72) Inventors: David A. Johnston, Painesville, OH (US); Jeffery W. Brooks, Mentor, OH (US); Michael J. Viste, Grafton, WI (US); Jatin P. Bhatt, Highland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/032,148

(22) Filed: Sep. 25, 2020

(65) Prior Publication Data
US 2022/0100177 A1    Mar. 31, 2022

(51) Int. Cl.
G05B 19/418    (2006.01)

(52) U.S. Cl.
CPC ... *G05B 19/41815* (2013.01); *G05B 19/4183* (2013.01); *G05B 19/41865* (2013.01); *G05B 19/4185* (2013.01)

(58) Field of Classification Search
CPC .......... G05B 19/41815; G05B 19/4183; G05B 19/41865; G05B 19/4185
See application file for complete search history.

(56) References Cited

U.S. PATENT DOCUMENTS

| 2004/0030453 | A1 | 2/2004 | Graf |
| 2007/0088533 | A1* | 4/2007 | Serizawa ......... G05B 19/41885 703/6 |
| 2017/0229991 | A1 | 8/2017 | Huber et al. |
| 2019/0210217 | A1 | 7/2019 | Jetté et al. |

FOREIGN PATENT DOCUMENTS

EP    3196719 A2    7/2017

OTHER PUBLICATIONS

Extended European Search Report for Application No. 21179771.7 dated Dec. 7, 2021, 12 pages.

* cited by examiner

*Primary Examiner* — Carlos R Ortiz Rodriguez
(74) *Attorney, Agent, or Firm* — Fletcher Yoder, P.C.

(57) ABSTRACT

Embodiments of this present disclosure may include industrial components in an industrial environment and a control system. The control system may receive a request to perform a control operation using the industrial components and may access a reference array associated with the industrial components. The reference array may include rows and columns, where each row may correspond to a respective industrial component of the industrial components. The control system may identify or program set points in the reference array associated with completing the control operation and may detect current motion components of the plurality of industrial components. The control system may generate control commands for the industrial components based on the current motion components, the set points, and/or the reference array. The industrial components may perform the control operation in response to receiving the control commands.

20 Claims, 7 Drawing Sheets

AUTOMATION CONTROL BASED ON A REFERENCE ARRAY

BACKGROUND

This disclosure relates generally to systems and methods for control command deployment techniques within industrial automation systems. More particularly, embodiments of the present disclosure are directed toward user definitions of associated components being used to deploy control commands to portions of the industrial automation systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial automation systems may include automation control and monitoring systems. The automation control and monitoring systems may monitor status and/or receive information from a wide range of devices, such as valves, electric motors, servo motors, a wide range of sensors, other suitable monitoring devices, or the like. One or more components of the automation control and monitoring systems, such as programming terminals, automation controllers, input/output (I/O) modules, communication networks, human-machine interface (HMI) terminals, and the like, may use the status and/or received information to provide alerts to operators to change or adjust operation of one or more components of the industrial automation system (e.g., such as adjusting operation of one or more actuators), to manage the industrial automation system, or the like.

Generally, the networked devices described above may be associated with information, such as different status, sensing data, or the like. The information may relate to an operation of the industrial automation system and may be monitored by the automation control and monitoring systems. Certain communication systems are used to transmit the information to automation control and monitoring systems of the industrial automation systems. For example, each networked device may communicate with the automation control and monitoring systems via wired or wireless communication networks. With this in mind, it may be useful to improve methods for communication between automation control and monitoring systems and networked devices within industrial automation systems, such as to improve the generation and deployment of operational commands to the networked components.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system may include industrial components that move in one or more directions in an industrial environment and a control system. The control system may receive a request to perform a control operation to implement using the industrial components and may access a reference array associated with performing the control operation using the plurality of industrial components. The reference array may include rows and columns, where each row may correspond to a respective industrial component of the industrial components, and where each column may correspond to a respective motion component of a motion profile for the control operation. The control system may identify set points in the reference array associated with completing the control operation and may detect current motion components of the plurality of industrial components. The control system may generate control commands for the industrial components based on the current motion components, the set points, and the reference array. Once generated, the control system may send the control commands to the industrial components. The industrial components may perform the control operation in response to receiving the control commands.

In another embodiment, a method may include receiving a request to perform a control operation to implement using industrial components. The industrial components may move in one or more directions in an industrial environment. The method may include accessing a reference array associated with performing the control operation using the industrial components. The reference array may include rows and columns. Each row may correspond to a respective industrial component of the industrial components, and each column may correspond to a respective motion component of a motion profile for the control operation. The method may include identifying set points in the reference array associated with completing the control operation and may include detecting current motion components of the industrial components. The method may include generating control commands for the industrial components based on the current motion components, the set points, and the reference array. The method may also include sending the control commands to the industrial components. The industrial components may perform the control operation in response to receiving the control commands.

In yet another embodiment, one or more tangible, non-transitory, computer-readable storage media may include executable instructions. These instructions, when executed by one or more processors, may cause the one or more processors to receive a request to perform a control operation to implement using industrial components, where each industrial component is able to move in one or more directions in an industrial environment. The instructions may cause the one or more processors to access a reference array associated with performing the control operation using the industrial components. The reference array may include rows and columns, where each row corresponds to a respective industrial component of the industrial components, and where each column corresponds to a respective motion component of a motion profile for the control operation. The instructions may cause the one or more processors to identify set points in the reference array associated with completing the control operation and to detect current motion components of the industrial components. The instructions may cause one or more processors to generate control commands for industrial components based on current motion components, set points, and the reference array, and, after generation of the control commands, may cause the processors to send the control commands to the industrial components. The industrial components may perform the control operation in response to receiving the control commands.

DRAWINGS

These and other features, aspects, and advantages of the present disclosure will become better understood when the following detailed description is read with reference to the accompanying drawings in which like characters represent like parts throughout the drawings, wherein.

Figure 1:
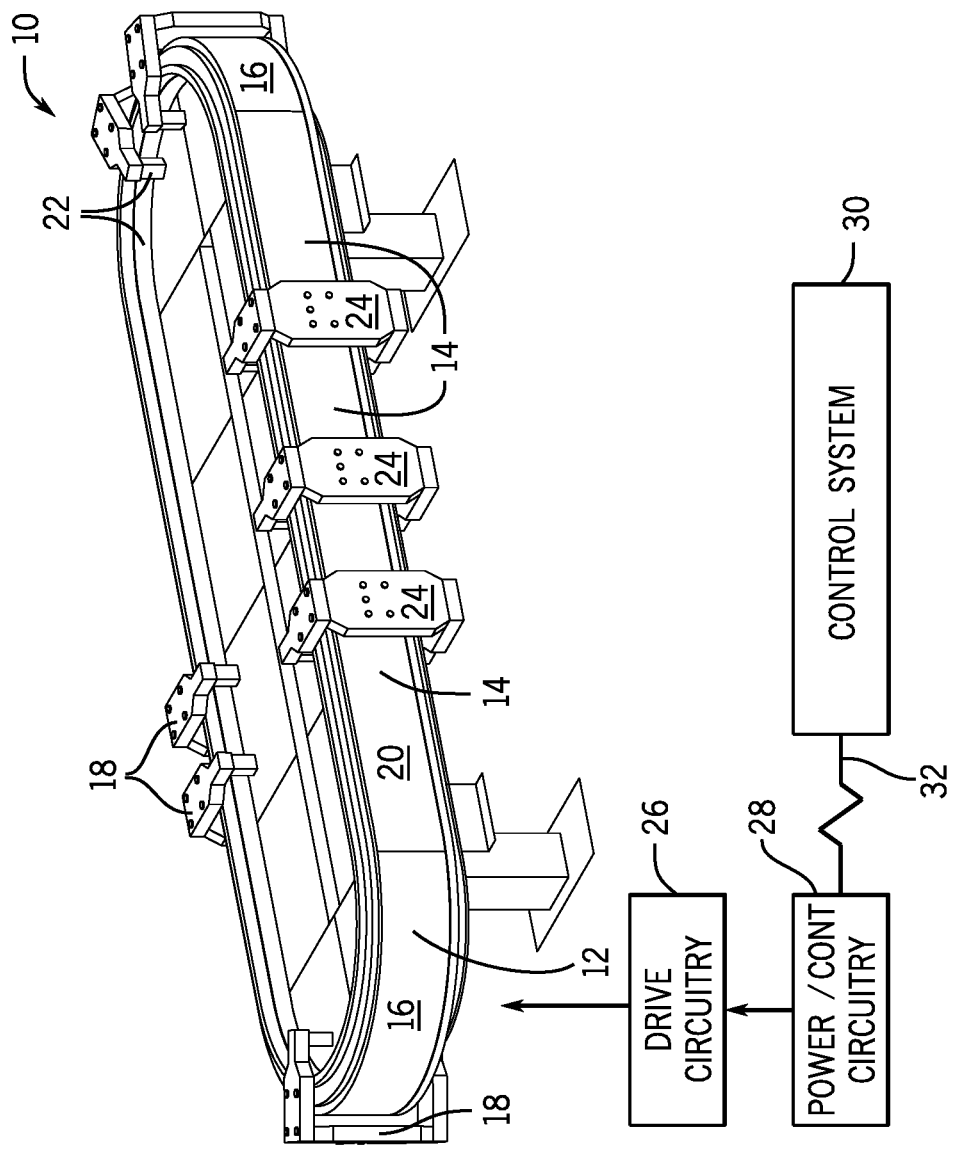
FIG. 1 is a perspective view of an example industrial automation system including a linear motor system, in accordance with an embodiment.
Figure 2:
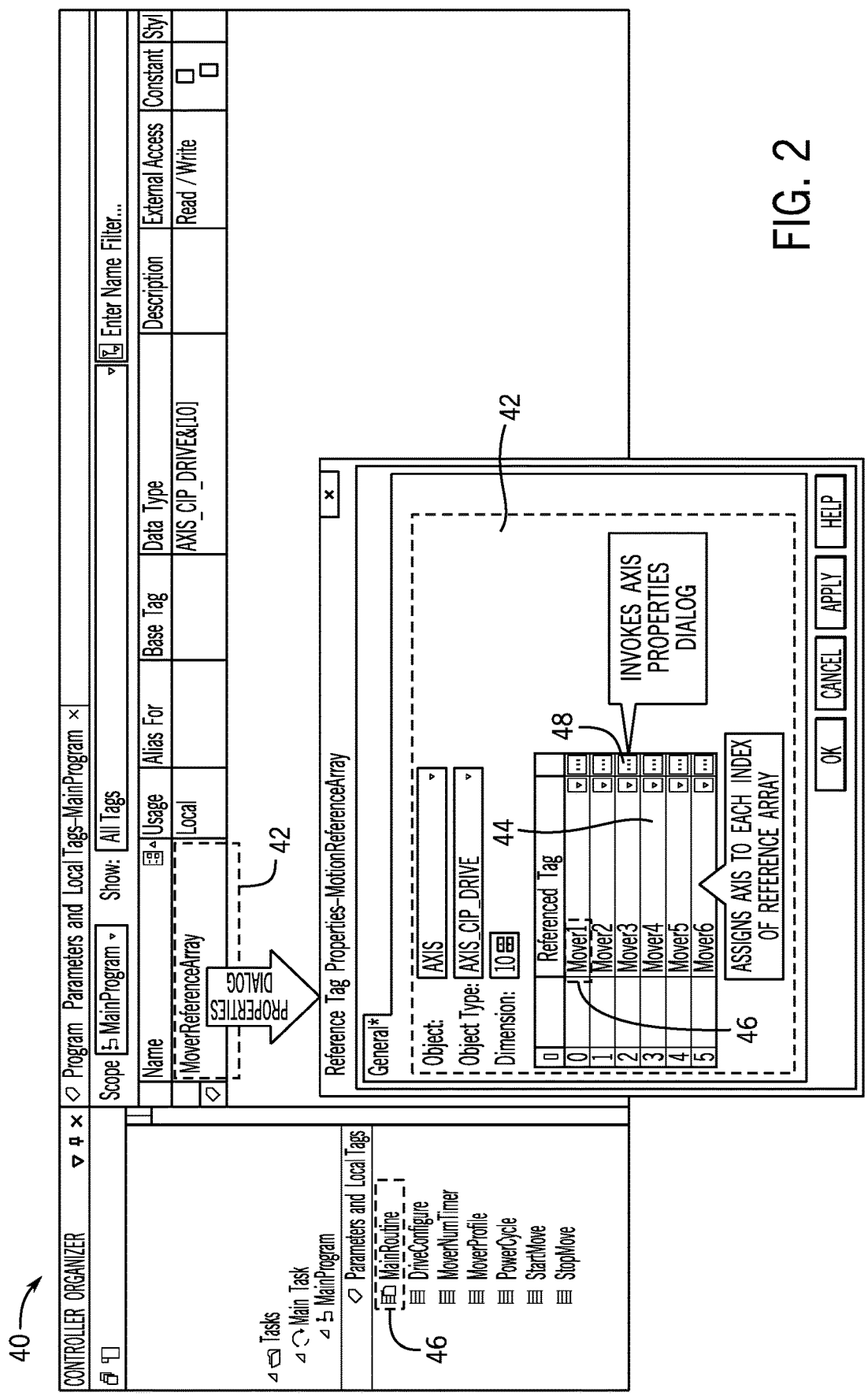
FIG. 2 is a block diagram of a graphical user interface (GUI) visualizing a reference array of the linear motor system of FIG. 1, in accordance with an embodiment.
Figure 6:
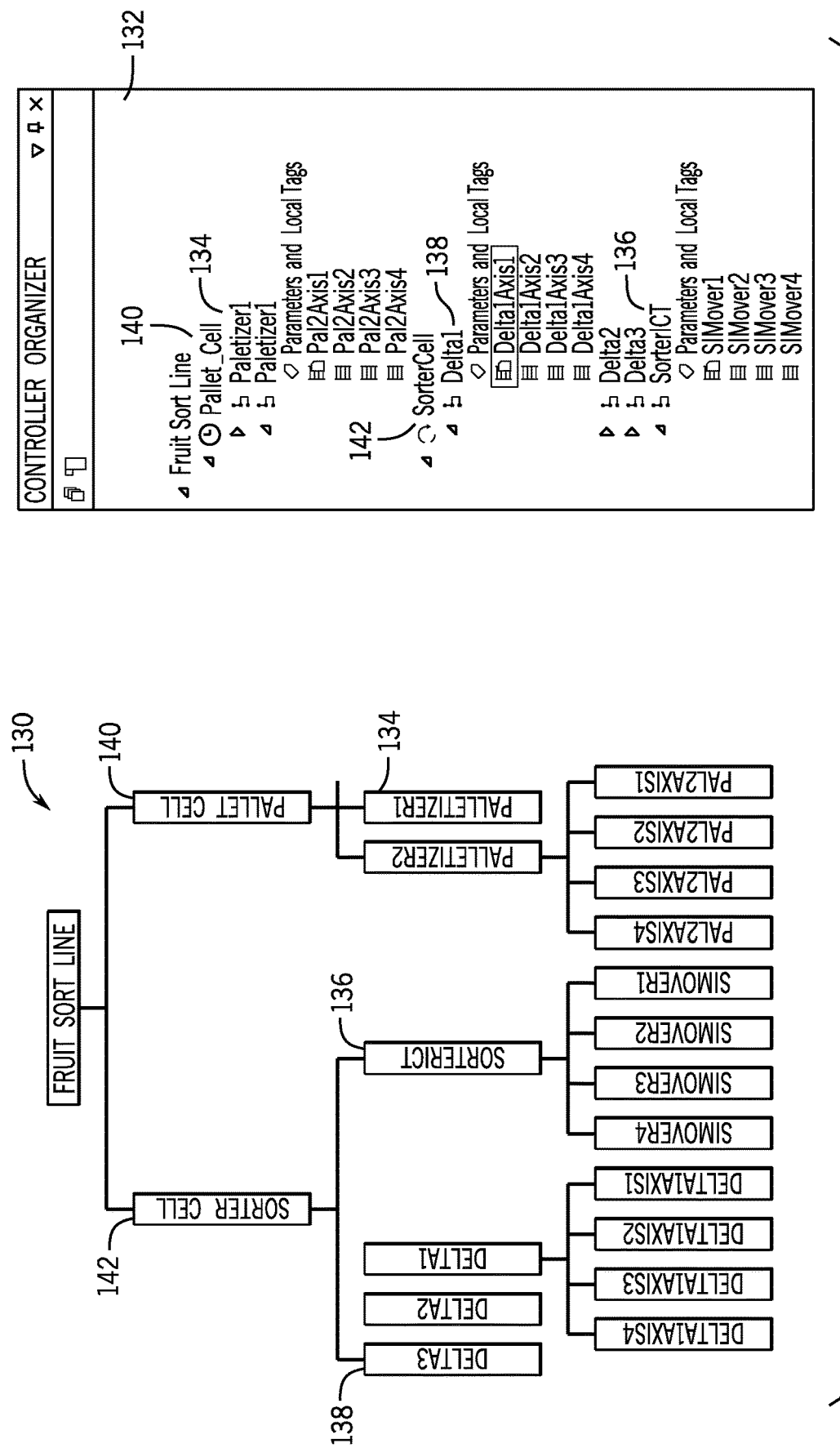
Figure 7:
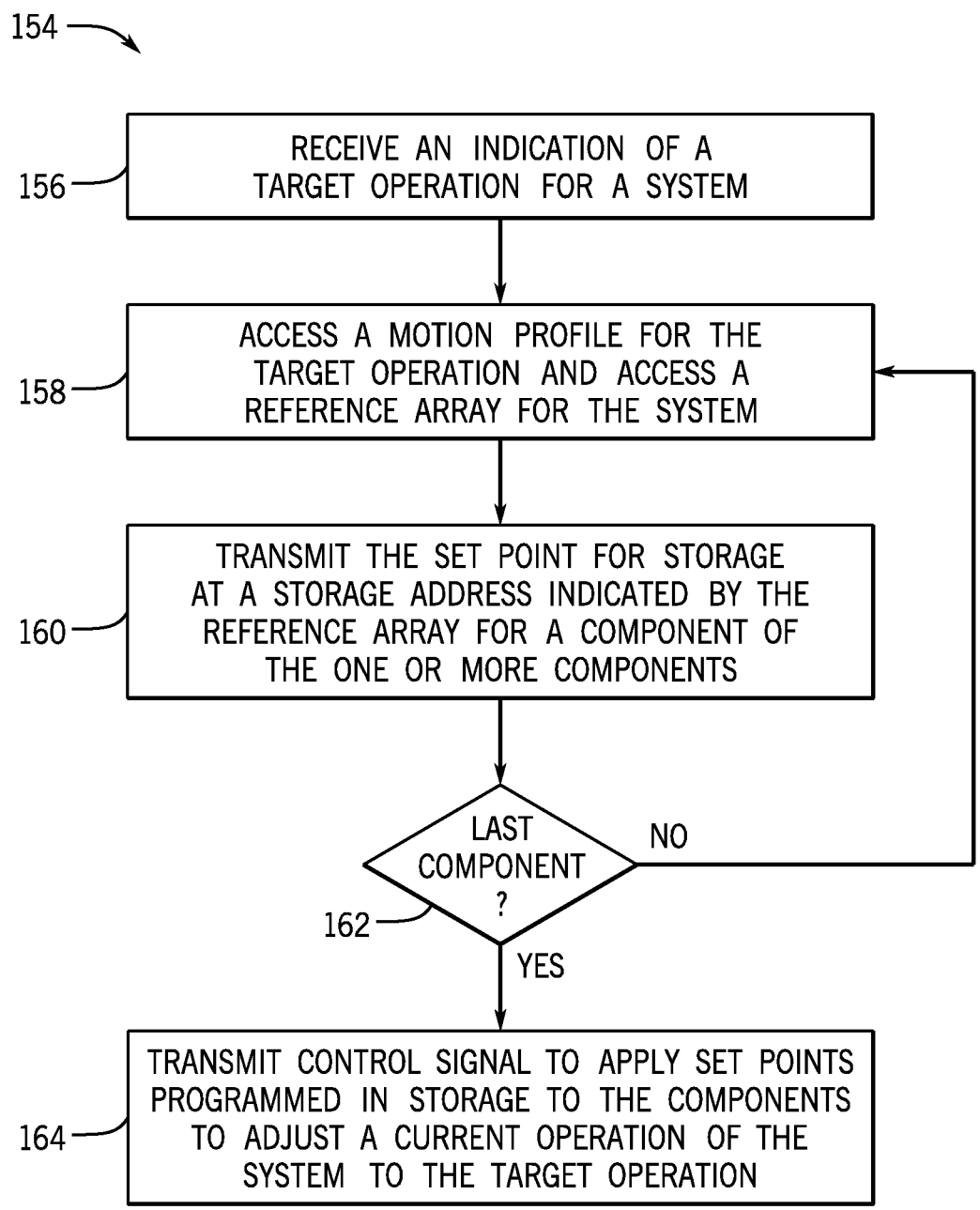

FIG. 6 is a diagrammatic representation of a structure of another reference array corresponding to a different system and a graphical user interface associated with the reference array, in accordance with an embodiment; and FIG. 7 is a flowchart of a method for using a motion profile and the reference array of FIG. 2 to program the linear motor system of FIG. 1 to repeat performance of an operation represented by the motion profile, in accordance with an embodiment.

DETAILED DESCRIPTION

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards systems and methods that improve control of industrial automation devices. Recent developments in industrial systems have caused increased deployment of automated systems in industrial automation systems, such as linear driver mover systems, robotic systems, and the like. Although these automated systems are useful for automating tasks that may be otherwise repetitive for a control system to deploy, applying operational changes to the automated systems may be challenging. For example, the automated systems may be vast with a large number of individual moving and/or networked components. Leveraging common parameters between the components of the automated systems, such as similar axis of motion (e.g., vectors with a direction and speed) defining movers of the linear driver mover system, and a common system for programming of the parameters, such as through references to objects collected in a reference array, may improve the efficiencies in which configurations or data are deployed to components of the automated system.

To further elaborate, an operator of an industrial automation system may be able to configure the operation of multiple components of the industrial automation system using a graphical user interface that provides access to references to objects associated together in a reference array. A reference array of like (e.g., same target type, similar, related) references to configurable objects of a system, a sub-system, a device, an automated process, and the like. Indeed, the reference array provides an array of axis (or other control parameters) references to permit (re)programming of one or more parameters associated with a respective object of the reference array. The reference array may also include an array of references to objects, and/or data associated with the objects, such that each object may be iterated through to permit programming of a same operation and/or to make the same adjustment to operational parameters of one or more objects of the reference array. In this way, the reference array may enable batch programming operations in industrial automation system. For example, when adjusting an operation of a mover system, to cause each mover of a mover system to increase 10 percent (%) in speed, a reference array for the mover system that includes a reference to each object (e.g., mover) of the mover system may be referenced by software to deploy commands to increase speed. Indeed, the reference array may be programmed by incrementing through (e.g., incremental loop function) each reference of the reference array, permitting a same loop operation to be used to change a speed parameter of each object of the reference array, as opposed to separate control signals being used to individually program each mover.

In some cases, the reference array includes references to objects of a system, where each reference to each object may include further references to control parameters associated with each object. The reference array may thus include nested indications of storage addresses to guide a control system to a location in memory (e.g., storage) that stores information related to the object representing the component, or the component itself, such as values for control parameters defining an operation of the component. An object referenced by the reference array may itself be considered a reference array of storage addresses indicating where values for control parameters are stored in the memory.

Through adjustment of values stored as the control parameters, a control system may adjust operation of components referenced using or otherwise associated via the reference array. For example, the control parameters may include indications of set points or desired configurations for implementation in components. Control parameters may, for example, include parameters, such as axis of motion, speed, velocity, acceleration, supply power, orientation, position, or the like. When sensed (e.g., obtained as sensing data), current operation characteristics of a component may be referred to as a motion component. In this way, when a component moves according to a sensed velocity, that sensed velocity may correspond to a velocity motion component or value for a velocity parameter. Sensing data may be obtained by monitoring circuitry and/or software of the control system, by onboard sensing and/or reporting circuitry and/or software of the component, or the like. Indeed, these devices may include any sensing devices, such as velocity sensors, pressure sensors, temperature sensors, motion sensors, image sensors, or the like to be used to identify motion components for a component and/or to implement a control parameter as a motion component set point.

It is noted that control parameters may change based on the type of system or component or may change based on a control operation or function provided by the system. For example, a mover-based automation system may include parameters different from that of a robotic arm-based automation system. The control system may change a control parameter by either directly writing a value to an index location of the reference array and/or by accessing a storage address in memory that the control system may directly read or write a value for the control parameter within.

Reference arrays may be stored in a memory that is accessible by the control system of the system corresponding to the reference array. The control system may be a central control system and/or a control system local to the system corresponding to the reference array, and thus may use the reference array to adjust operation of the system. Using the reference array to control the multiple components of the industrial automation system with a same reference array may improve control deployment operations of the control system since relatively fewer adjustment commands may be used to change operation of the components as opposed to sending multiple adjustment commands to the multiple components.

Reference arrays may be applied to various types of systems of an industrial automation environment. For example, a control system may use a reference array when controlling operation of robotic systems, when controlling a system with many moving components of a similar type (e.g., each are a mover), when controlling a system with many moving components of disparate types (e.g., some components are movers while some components are conveyors, hydraulic arms, and/or robotic arms), when visualizing operations of a system synchronous to operation of the system, such as in visualization software that render graphics indicative of system status, operations, or the like, and so on. As such, many industrial automation processes may benefit from use of the reference array. Indeed, the reference array may provide a collection of seemingly disparate items of a system in a same data structure to improve data recording, data acquisition, data display, operational control, and the like.

Several descriptions of various terms are provided herein to facilitate a better understanding of the present disclosure. Although the descriptions provide some context for each term, the descriptions should not limit the use of each term with respect to the embodiments described herein. With this in mind, the term "reference" may include user-defined data such as a location address to a variable or to an instance of a function block of a specified type. The term "array" may refer to a data structure that aggregates data objects, with identical attributes, each of which may be uniquely referenced by subscripting. The term "reference array" may refer to an array of heterogeneous data objects or homogeneous data objects to support of control-based activities, where each data object may be used for the same interface and access mechanism. It is noted that although a concatenation of two terms related to programming application, "reference array" deviates from definitions of "reference" and "array." In particular, as used herein, "reference array" is directed toward use in industrial applications, such as industrial control applications, and may be particularly referenced with respect to data handling, transmission, and/or referencing operations of industrial systems, or the like. Indeed, a "reference array" may be a flexible component in which to encapsulate and/or process data or references to store data of same or different data types, of same or different applications of the same or different storage locations, or the like. Indeed, the "reference array" may unify data handling operations in industrial applications to improve data display and reference operations on a device-level, system-level, or the like, in ways that a "reference" or an "array" may be unable (e.g., "array" being limited to data objects with identical attributes, "reference" being limited to a location address) to do. As will be appreciated, a "reference array" may include any suitable data object (e.g., type, structure, device) in any combination of attributes. For example, a "reference array" may refer to a collection of data objects each having different attributes defining the data objects, to a collection of data objects where subsets of the data objects have one or more different attributes, to a collection of data objects and additional arrays of references that each point to further storage locations, or the like. Indeed, a "reference array" may specify properties or operational set points for components of a device, may specify sub-components of a component of the device, may specify the device as a sub-component of a system, or the like. The "reference array" may be flexible in its ability to be applied to improving control operations of industrial systems.

Turning now to the drawings, and referring first to FIG. 1, a linear motor system 10 is illustrated for moving articles or products around a track 12. As will be appreciated by those skilled in the art, in many applications, the linear motor system 10 may operate with other machines, robots, conveyers, control equipment, and so forth (not shown) in an overall automation, packaging, material handling, or other application. The linear motor system 10 itself generally includes a "linear motor" as discussed below, in which the moving components are positioned, accelerated, decelerated, and generally moved under the influence of controlled magnetic and electromagnetic fields. In the illustrated embodiment, the track 12 comprises straight track modules 14 and curved track modules 16. These modules may be generally self-contained and mountable in various physical configurations, such as the oval illustrated in FIG. 1. It should be noted that other configurations are equally possible as discussed below. The configurations may form closed loops of various shapes but may also include open-ended segments and/or diverter tracks, such as diversion tracks or rotary tracks (e.g., tracks that rotate). The linear motor system 10 may also include one or more movers 18 mounted to and movable along the track 12. Control parameters, such as the position, velocity, acceleration, and higher order derivative parameters, are controllable for these movers 18 by appropriate control of the coils of the linear motor system 10 that are energized and de-energized to implement values (e.g., set points) represented by the control parameters. In the illustrated embodiment, the movers 18 interact with stationary elements in and around an outer periphery 20 of the track 12, although other configurations may be envisaged. A sensor system 22 is provided to detect positions of the movers 18 around the track 12, and such sensor systems 22 may include permanent magnets, energized coils, Hall Effect sensors, or any other suitable devices to perform such detection. In general, one component of the sensor system 22 is mounted on the movers 18, while another component will be mounted at fixed locations around the track 12.

Each mover 18 may include a mounting platform 24. In an actual implementation, various tools, holders, support structures, loads, and so forth may be mounted to this mounting platform. The movers 18 themselves may be different from those shown, such as to accommodate the various loads. While a horizontal configuration is illustrated in FIG. 1, other orientations may also be provided, such as ones in which the illustrated oval is generally stood on a side or end, or at any angle between. For example, one or more movers 18 may be suspended from the track and/or may float above the track.

The linear motor system 10 further includes circuitry for controlling a movement of the movers 18. In the example of FIG. 1, this circuitry includes drive circuitry 26 that provides signals to each track module 14, 16, and individual coils (see below) of the track modules 14, 16 to create electromotive forces that interact with magnets on the track modules 14, 16 to drive the movers 18 to specific locations, and at specific velocity, accelerations, and so forth (e.g., to move along a surface of the track 12. This drive circuitry 26 may include inverter circuitry that makes use of power electronic switches to provide drive power to the individual coils of each module in a controlled manner. In some cases, the drive circuitry 26 may be included in each individual track module 14, 16 and/or mover 18, and signals provided to the drive circuitry 26 by power and control circuitry 28. This power and control circuitry 28 (and the drive circuitry 26) may receive feedback from the movers 18 and/or from the sensor system 22 to detect the location, velocity, acceleration, and so forth of each mover 18. In certain embodiments, the movers 18 may also be recognized by the power and control circuitry 28 as associated with individual axes of motions that are independently controlled, but with regulation of their position, velocity and acceleration to avoid conflicts, collisions, and so forth. The regulation of their position, velocity and acceleration to avoid conflicts, collisions, and so forth may be maintained as part of a coordinated motion and/or coordinated industrial automation operation.

The particular motion profile implemented by the power and control circuitry 28 may be implemented upon the design and commissioning of the linear motor system 10, here again, depending upon the particular task to be performed. Finally, various remote control and/or monitoring circuitry (e.g., control system 30) may be provided and this circuitry may be linked to the linear motor system 10 by one or more networks 32. The control system 30 may generally coordinate of the operation of the linear motor system 10 with other automation components, machine systems, manufacturing and material handling machines, and so forth.

To program motions of each mover 18, each mover 18 may be respectively loaded with values corresponding to parameters (e.g., set points). This process may be time consuming, not only due to how each mover 18 is to be individually programmed but also due to how each mover 18 is to be programmed relative to each other mover 18. To phrase this differently, the control system 30 may control respective movers 18 according to coordinated motion profiles respectively programmed for each mover 18 based on the motion profile of each other mover 18 to implement a coordinated control operation (e.g., a coordinated motion, coordinated industrial automation operation). However, the process of programming the movers 18 may be improved by using one or more reference arrays to batch program multiple movers 18 or other components, between the same or different/disparate systems.

To elaborate, FIG. 2 is an illustration of an example graphical user interface 40 visualizing a reference array 42 (e.g., via a display device being actively driven by a processor or by the control system 30 to render images). The reference array 42 may include a single dimension array that includes entries 44 associated with objects (e.g., logical objects). Each entry 44 of the reference array 42 may correspond to components of the linear motor system 10 (e.g., indicated by identifier 46). Each entry 44 may correspond to a component in an industrial automation system, such as the linear motor system 10. Each component may be represented by a logical object defined by another reference array 42 with another set of entries 44 for each control parameter defining operation of the component. This referential structure may be generally referred to as a level of indirection (e.g., a reference or indication stored in an entry of a reference array 42 configured to cause a programmatic redirect to another reference array 42).

Reference arrays 42 may be based on a hierarchical, flexible structure that may use any number of levels of indirection. The reference array 42 may be defined for a system, and each entry 44 of the reference array 42 may include references to other reference arrays 42, while may include additional references to additional reference arrays 42. Nesting of reference arrays 42, as suggested, may permit levels of components and/or command hierarches to be integrated into the structure of the reference array 42. Indeed, in this described example one level of indirection may be used, however any level of indirection (e.g., two levels, three levels . . . N levels) may be used with a reference array 42, permitting a varying amount of granularity of references to be used with reference arrays 42.

Figure 3:
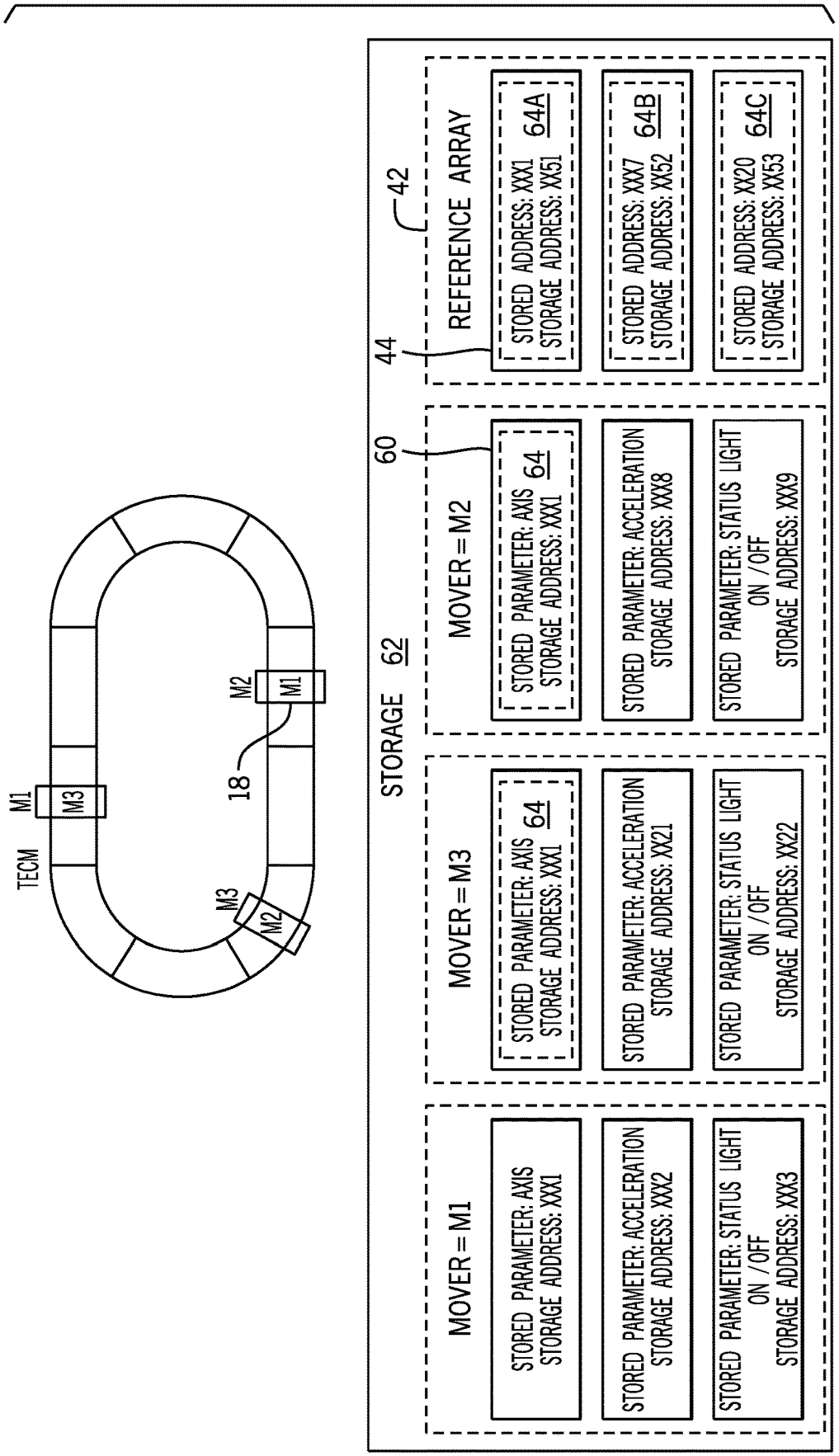
FIG. 3 is an illustration of the linear motor system 10 of FIG. 1 and a portion of its corresponding reference array of FIG. 2 represented in storage, in accordance with an embodiment.

Elaborating further on reference arrays 42, FIG. 3 is an illustration of the linear motor system 10 of FIG. 1 and a portion of its corresponding reference array 42 illustrated as associating control parameters 60 to locations in storage 62, and in particular to values stored at storage addresses 64 indicated by entries 44 of the reference array 42. The various components described in FIG. 3 may include hardware elements (e.g., circuitry), software elements (e.g., a tangible, non-transitory computer-readable medium storing instructions), or a combination of both hardware and software elements. It should be noted that the control system 30 and the storage 62 may be combined into fewer components or separated into additional components. For example, the storage 62 and the control system 30 may be included in a single component.

The control system 30 may couple to the storage 62 using a wired connection, a wireless connection, or both. The storage 62 may be tangible, non-transitory, computer-readable media that stores instructions executable by the control system 30 and/or data to be processed by the control system 30. For example, the storage 62 may include random access memory (RAM), read only memory (ROM), rewritable non-volatile memory such as flash memory, hard drives, optical discs, and/or the like. In some cases, the storage 62 may include a database referenceable by the control system 30. Thus, the storage 62 may include hardware and/or software to provide a Sequel (SQL) database and/or may use late binding techniques to provide data in response to an index and/or access of a reference array 42. Other suitable database and/or programming methods may be used with the storage 62.

It is noted that the control 30 may generate the reference arrays 42 at start up or initialization (e.g., commissioning) of a sub-system of an industrial automation system, or the like, to define a logical definition of components and control parameters 60 associated with the components of the system. In some cases, a user may interact with software, such as a development software, a GUI, an HMI, or the like to generate reference arrays 42. Indeed, the software may render an interface on a display that permits a user to "drag-and-drop" associations between components to form reference arrays. Furthermore, the control system 30 may perform discovery operations to identify components within the system for association (e.g., inclusion) within the reference array 42, such as to confirm (e.g., verify) the reference array 42 generated in response to user input and/or to generate the reference array 42 itself. The control system 30 may perform device discovery operations in response to a signal indicative of a commissioning of a new component within the system, to an instruction from an input device and/or in response to a counter or timer initiating the operation (e.g., on a periodic or aperiodic basis), or the like. In this way, the control system 30 may generate the reference array 42 inter-associating many movers 18 to each other (as shown in FIG. 3) in response to results from a discovery operation, in response to user input or the like.

Each mover 18 may operate according to control parameters 60. The control system 30 may associate values for control parameters 60 stored at particular portions of the storage 62 at storage addresses 64 with certain movers 18 and/or other components of the linear motor system 10. The control parameters 60 may include set points associated with a target operation used to adjust the movers 18. A control parameter 60 corresponds to a storage addresses (e.g., XXX1, XXX2 . . . XX20) that retain values for the control parameter 60 set point at the storage address in storage 62. It is noted that for purposes of discussion, the storage addresses are represented by XXX1 through XX53, but it should be understood that these digits are arbitrarily selected digits to represent different memory locations and may or may not correspond to storage addresses notations used in an actual implementation.

As values of the control parameters 60 change for each mover 18 (e.g., M1, M2, M3), each mover 18 may physically move or operate according to the changed values of control parameters 60, either by a control system 30 of the mover 18 accessing the storage 62 itself to obtain the set point and/or by the control system 30 of the linear motor system 10 transmitting a control signal to the mover 18 to program the operation according to the set point. Values stored in the reference array 42 in the entries 44 or referenced via values of the entries 44, such as the values of the control parameters 60, may be indexed and programmed directly (e.g., [reference array name].[entry index]=value) and/or programmed indirectly (e.g., via loop operation to increase one or more values associated with an entry 44 by an increment value, decrease by a decrement value, or any suitable adjustment). The control system 30 may transmit the control signal to one or more movers 18 at a same time, such as by using a wireless signal or other suitable connection.

Each entry 44 of the memory array 42 may reside in storage 62 at a storage address 64 (e.g., portion of storage 62 circuitry dedicated to a storage address), such as at a storage address 64 between XX51 and XX53. The entries 44 may include a reference to another storage address 64 (e.g., Address: XXX1, XXX7, Address XX20). Respective entries 44 may store a pointer or reference to respective movers 18, and each respective mover 18 may be further represented by a reference array storing control parameters. References to additional storage addresses 64 may correspond to a starting address of a portion of the storage 62 dedicated to one of the movers 18 (e.g., component referenced by the entry 44 of discussion). In this way, the reference array 42 may group references to storage addresses 64 of each associated mover 18 to reduce complexities associated with programming of movers 18 otherwise having disparate storage addresses 64. When indexing entries 44 of a reference array 42, the control system 30 may access the entry 44 or any entries of a nested reference array 42 corresponding to the entry 44 (e.g., when indirection is used to redirect indexing of the control system 30 to lower-level reference arrays 42).

Since the reference array 42 provides a constant index to the different storage addresses 64 of the different components referenced via the entries 44, the reference array 42 may be accessed and programmatically executed in loops (e.g., "while" loops, "for" loops) to change or deploy control operations (e.g., program values starting at storage address 64 indicated by the storage address 64A at XX51 then repeat for storage address 64B at XX52 and then repeat for storage address 64C at XX53). It is noted that although a 1-unit increment is used in this example (e.g., between XX52 and XX53 is a 1-unit of increment), the constant index may be of any sized increment, such as 2-unit increment, 3-unit increment, or the like (e.g., XX52 to XX54 corresponds to a 2-unit increment. Incrementing through entries 44 of the reference array 42 may permit access of storage addresses 64A, 64B, 64C. An index operation with a 1-unit increment is able to access data stored at addresses XXX1, XXX7, and XX20 when using the reference array 42, where these addresses may not be stored in a pattern that promotes easy access to the control parameters 60 at the storage addresses XXX1, XXX7, and XX20.

Indexing operations may be used to read values stored as set points for one or more control parameters 60 and/or to write values stored as one or more control parameter 60 set points. A get system value (GSV) function may be used to retrieve information (e.g., control parameters, values) at a storage address 64 and/or a set system value (SSV) function may be used to store information at the storage address 64. The GSV function and/or SSV function may be used in combination with indexing-based looping operations to increment a value stored as a control parameter 60 a same amount for each object of the reference array 42 and/or to perform any suitable combination of operations on data stored at storage addresses 64 referenced by one or more reference arrays 42. It is noted that the reference array 42 shown in FIG. 3 includes one level of indirection, however multiple levels of indirection may be used to further organize references and/or objects of the reference array 42. For example, a reference array 42 may include a storage address in the entry 44 to another reference array 42 that includes its own references to storage addresses 64 for particular parameters of components, additional component objects, additional reference arrays 42, or the like.

It is noted that each mover 18 may be programmed to a same value for a same property, however due to mechanical and/or electrical variations between each mover 18, each mover 18 may operate within a threshold (e.g., 1% variation, 5% variation, X % variation) of another operation for another mover 18. Indeed, a first mover 18 may move at a speed greater than a second mover 18, however the difference may be permitted when within a 1% difference, a 2% difference, or any suitable threshold amount of difference (e.g., X % difference). It is noted that the reference array 42 and data associated with the reference array 42 may be a logical construct stored in storage accessible to components of the industrial automation system and referenceable by the component, such as control systems 30, respective industrial automation devices, sensors, motor drivers, or the like.

When considering reference arrays 42, a reference array 42 may include one or more rows and one or more columns. Each row may correspond to an industrial automation component (e.g., a mover, a robot, a programmable component), and each column may correspond to the stored parameters associated with each of the industrial automation components. Column groups associated with parameter definitions for the industrial automation components may be repeated to capture changes in parameters over time. In some cases, a parameter stored as a value in a field formed the intersection of a respective row and a respective column may correspond to a set point (e.g., a target final or ending position or operation of a respective industrial automation component). Indeed, set points may be used by a control system of a mover, or other industrial automation component, to instruct the control system which set point to guide operation of the mover, or other industrial automation component, toward implementing.

Repeating columns of parameters with different values may help implement or guide respective motions of respective industrial automation components to implement the control operation. For example, moving multiple movers to transition a load from a first location to a second location may be coordinate through repeated columns of parameters, where specific values stored for each parameter may change over time. In this way, columns of parameters may be repeated to show changes in values stored as the parameter in the entry over time. Table 1 shows an example of this (where "Acc." refers to an acceleration parameter).

TABLE 1

| Mover ID | time = 1 | | | time = 2 | | | time = 3 | | |
|---|---|---|---|---|---|---|---|---|---|
| | Axis | Acc. | Status Light | Axis | Acc. | Status Light | Axis | Acc. | Status Light |
| M1 | 5 | 10 | ON | 3 | 20 | ON | 2 | 0 | OFF |
| M2 | 1 | 1 | ON | 2 | 20 | ON | 1 | 0 | OFF |
| M3 | 13 | 0 | OFF | 5 | 0 | OFF | 1 | 0 | OFF |

Referring to Table 1, each entry of the motion profile based on reference arrays 42 indicates a value of a parameter for a given mover at a particular relative time of the motion profile. A motion profile may associate one or more reference arrays 42 to be used to implement a control operation. The motion profile may include set points to be sequentially implemented in each of the industrial automation components perform the control operation. The control system 30 may increment through each value of each field for each mover (e.g., industrial automation component) to perform the control operation. Indeed, as the control system 30 increments through the various rows and/or columns of the motion profile and applies the set point stored as the value for each field, the control system 30 may program a position for each respective mover to incrementally direct the system to the end point (e.g., end position, final position) of the motion profile to implement a control operation.

The control system 30 may transmit commands to components associated with an entire column at a same time. For example, the control system 30 may transmit a command to implement an axis parameter value of 5 to a first mover (M1) at a same time as transmission of a command to implement an axis parameter value of 1 to a second mover (M2). There may be no upper limit to a number of simultaneous commands that can be transmitted (e.g., as long as a suitable number of routings or communicatively couplings between control systems is present).

In some cases, the control system 30 may use a counter to track a relative position within the motion profile and/or the reference array 42 of a current processing operation (e.g., to generate a command signal based on the set point stored in the field). For example, the control system 30 may identify a current motion component associated with the industrial automation component (e.g., a current motion component may be a value corresponding to a current parameter, such as acceleration, that is characterizing motion of the industrial automation component). The control system 30 may identify a first set of entries in the reference array 42 based at least in part on the current motion components (e.g., a characterization or quantization of a current motion).

The control system 30 may determine a count between the first plurality of entries and a second plurality of entries corresponding to the plurality of set points. In this way, the control system 30 may use the current motion components of one or more industrial components (e.g., for one or more rows) to identify which set of columns of the motion profile that the industrial components are currently corresponding to (e.g., to determine whether M1 is operating according to set points of time=1, time=2, or time=3). When the current motion components match a final position (e.g., when combination of values of fields equal an additional combination of values of fields for a last column representative of a final position of the motion profile), the control system 30 may not increment a counter since, for example, the current motion components are already determined in the final position of the motion profile (or determined to be programmed with the final set point of the motion profile). When these components do not match, the control system 30 may determine which column includes values that do match (or are within a threshold of the value, such as 1% or 10% difference in value from the set point) the current motion components.

The control system 30 may identify the matching column (e.g., column that includes matching values) as the starting column, and may increment a counter causing a progression to a next column subsequent to the starting column. In this way, the control system 30 may increment the counter to determine a count value, and may use the count value when retrieving values stored in fields of the subsequent column. Indeed, the count value may be used in indexing operations to retrieve set points and/or values stored in the reference arrays 42 and/or stored in association with the motion profile. The count value corresponds to one column of the plurality of columns, and as the count is adjusted, the various columns may be accessed. Indeed, the control system 30 may generate control commands based at least in part on the counter value and values corresponding to fields referenced with the reference array using the counter value. Once the commands are generated, the control system 30 may transmit the commands to the industrial automation components and/or to control systems of the industrial automation components (e.g., local control system to the industrial automation component. After transmission of the commands to the industrial automation components, the control system 30 may increment the counter to generate an updated count value, generate an additional portion of control commands based at least in part on the updated count value and the reference array, and send the additional portion of control commands to the industrial automation components.

Figure 4:
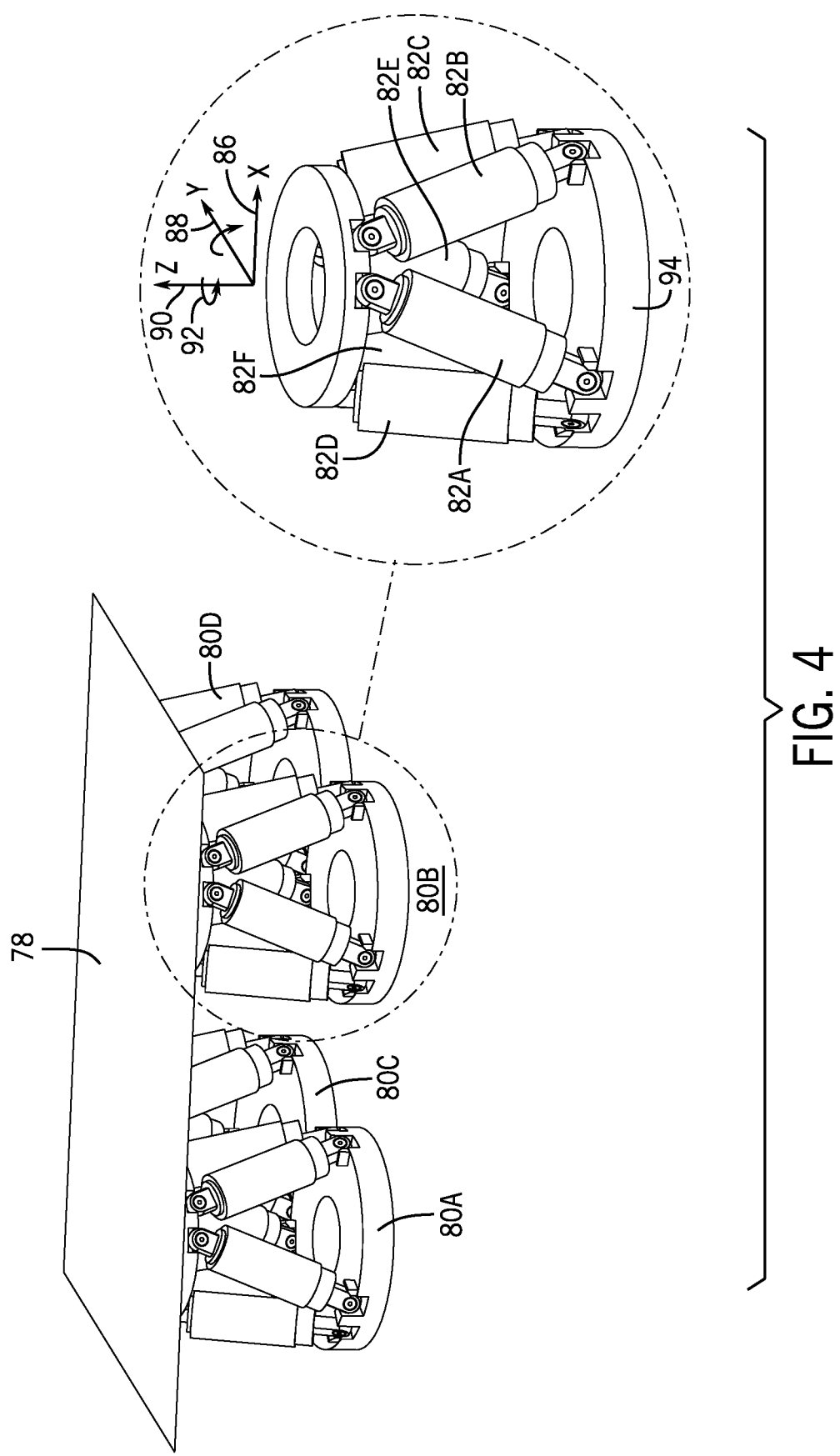
FIG. 4 is an illustration of hexapod robots carrying a platform as another example of a portion of an industrial automation system, in accordance with an embodiment.

One example use of the reference array 42 is using multiple hexapod robots to adjust a position (e.g., height) and orientation of a platform supported by the hexapod robots, as shown in FIG. 4. Keeping the foregoing in mind, FIG. 4 is an illustration of four hexapod robots 80 carrying a platform 78 as part of a tube carrying system (e.g., a tube may be place on the platform 78 and/or may be placed on multiple of the platforms 78 and thus has a position based on positions of multiple platforms 78). It is noted that a platform 78 is not necessarily a requirement for carrying a tube, or any load, since hexapod robots 80 may be mounted with end effectors to hold a tube, or other mechanical variations may be used.

Each hexapod robot 80 (80A, 80B, 80C, 80D) may be moved into respective positions based on a combination of positions of six axis devices 82, among other control parameters 60. Indeed, each axis device 82 may be able to expand or retract based on an extension value stored as a control parameter (e.g., control parameter 60 of FIG. 3). The control system 30 may reference values stored as control parameters 60 to determine how long (e.g., a relative length such as 50% or 80%) to extend or retract the axis device 82. For example, a respective axis device 82 may extend proportionally to a value stored as the control parameter 60 for the length parameter, such that the axis device 82 extends farther as the value increases.

Based on a combination of extension values used for each of the axis devices 82, for each hexapod robot 80, the control system 30 may orientate the platform 78 into a particular X-axis 86 position, a Y-axis 88 position, a Z-axis 90 position, and an orientation 92 position. The control system 30 may generate and send control signals to each hexapod robot 80 to adjust its respective position and orientation to cause the platform 78 supported by the hexapod robots 80 to move to a certain position and orientation. It is noted that the orientation is considered a relative amount of rotation around an axis (in this case, the Z-axis 90 since the hexapod robot is stationary and fixed at its base 94). Indeed, by specifying the axis parameters for each hexapod robot 80 of the four hexapod robots 80, for example, an overall orientation and position may be specified for the platform 78 or object carried by the four hexapod robots 80 (e.g., a portion of a pipe or a portion of a load). Once specified, the hexapod robots 80 may adjust to orient themselves in the specified positions.

After the tube carrying system is moved to the desired position and orientation via respective programming of the various hexapod robots 80, in some cases, the control system 30 may store a motion profile used to obtain the desired position and orientation of the tube carrying system. The motion profile may capture control parameters 60 for each component (e.g., each axis device 82 of each hexapod robot 80). The motion profile may capture respective extension values assigned to each of the six axis devices 82 for each of the four hexapod robots 80 for each of the four platforms 78 to recreate the position and orientation of the platforms of the tube carrying system. The motion profile captures positions and/or orientations of the platforms 78 and nested components used to position and orient the platform 78 as values to be implemented in the entries 44 for the nested components at a later time to cause, at the later time, each nested component (e.g., one or more controllable portions of one or more hexapod robots 80) to achieve placement or movement of the platforms 78 into desired final positions and orientations, where desired final positions and/or orientations are the same or substantially similar to the original positions and/or orientations used to generate the motion profile (e.g., captured by the motion profile).

After saving the motion profile, the control system 30 may generate commands to change values of control parameters 60 for each of the hexapod robots 80 to move the platform 78 to the desired position, referencing the reference arrays 42 to access storage locations (e.g., storage address 64) of the control parameters 60. As a result, the control operation may be easily deployed to other systems of similarly arranged hexapod-platform component structures without sending unique commands to each hexapod robot 80. It is noted that commands may be copied to other of the hexapod robots 80 after being defined for a first hexapod robot 80, even when all referenced in a same reference array 42. It is noted that the control system 30 may apply the motion profile to the same tube carrying system used to generate the motion profile, or another tube carrying system, to repeat performance of the operations according to the saved positions and orientations and the saved timeline.

Figure 5:
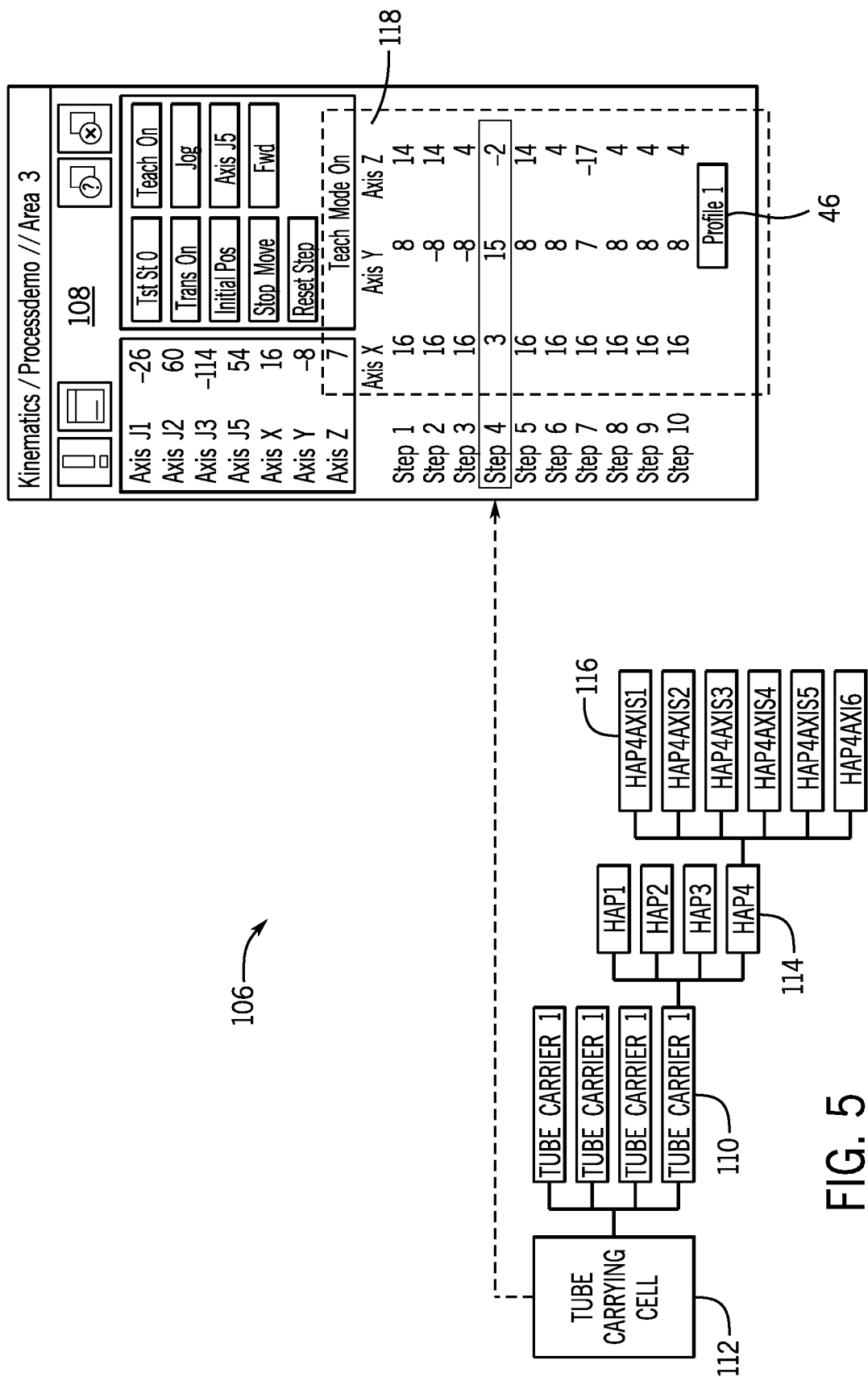
FIG. 5 is a diagrammatic representation of a structure of a reference array corresponding to the example hexapod robot of FIG. 4 and a graphical user interface associated with the reference array, in accordance with an embodiment.

To elaborate further on motion profiles and reference arrays 42, FIG. 5 is a diagrammatic representation 106 of the reference array 42 structure and a graphical user interface (GUI) 108 associated with the hexapod robots 80 of FIG. 4. Four systems (e.g., "Tube Carrier 1" identified by identifiers 110) of four hexapod robots 80 are used to carry a tube, and thus may be associated together in a system-level reference array 42 identified by identifier 112. Each hexapod robot 80 is identified by one of identifiers 114 (e.g., HAP1 . . . HAP4) and are each associated with six axis devices 82 control parameters 60. For example, the fourth hexapod robots 80D (e.g., HAP4) has an X-axis 86 position, a Y-axis 88 position, a Z-axis 90 position, and an orientation 92 defined by respective extension values assigned to each of its six axis devices 82 (e.g., HAP4AXIS1 . . . HAP4Axis6) identified by identifier 116. The combination of the extension values of each axis device 82 changes positions and orientations of the platform 78.

Referring back to FIG. 2 in combination with FIGS. 3-5, the file identifier 46 may identify a motion profile and the motion profile may be generally represented as a visualization of the GUI 108. The motion profile may include values of control parameters 60 to be programmed to repeat performance of a coordinated motion represented by the motion profile. The motion profile may associate values of control parameters 60 with operational sequences (e.g., steps) performed over time (e.g., implied progression over time via enumeration of step 1 through step 10). Metadata of the motion profile may indicate which components of the reference array 42 are to implement which of the stored values for control parameters 60. In this example, the motion profile shown in the GUI 108 indicates operations performed over time to orientate a tube carrying system in various positions and orientations 118 overtime. Indeed, metadata of the motion profile shown in the GUI 108 may indicate to the control system 30 how to adjust a position and/or orientation of each respective hexapod robot 80 to implement the various positions and orientations 118 overtime. The positions and orientations 118 may enable the tube carrying system to perform a control automation operation, a coordinate motion operation, or the like. The control system 30 applies the motion profile shown in the GUI 108 to one or more components in accordance with the timeline of the operations to repeat performance of the control automation operation, such as lifting a tube to a particular position, or moving the tube from one location to another location.

In some cases, the control system 30 may memorialize a process of accessing storage addresses 64 indicated via the reference array 42, adjusting values stored at the storage addresses 64, and proceeding to repeat these operations at a later time as part of a motion profile. For example, the "MainProgram" motion profile of FIG. 2 may represent a primary mover profile that is to be a default motion for use by the movers 18. Furthermore, values stored as the "PowerCycle" property may define when (e.g., when arriving at a location, when a time occurs or a duration of time passes) the movers 18 are to stop during an operation and reset themselves (e.g., power cycle involves powering off then powering on) and/or values stored as a "StartMove" property may define in which direction (e.g., forward, reverse), to what speed, or the like each mover 18 is to begin moving as part of the motion profile. Values stored as a "DriveConfigure" property may define speeds, accelerations, velocities, or the like associated with control parameters 60 characterizing movement of the movers 18. After generating the motion profile as a template, the control system 30 may apply the motion profile to another reference array 42 to deploy the same control sequence of operations for a second subset of components.

The control system 30 may access a stored motion profile at a later time when programming a different group of movers 18 (e.g., movers 18 of a same type and of a different or same quantity of movers 18), thereby saving time both in the creation and configuration of the motion profile but also in the debugging of the motion profile (e.g., verifying that the coordinated motion is executed at runtime as desired). The motion profile generated to define a control sequence for a first reference array 42 associated with three movers 18 and one robot may be used to deploy a same or a similar control sequence in another system corresponding to a second reference array 42 having different three movers 18 and a different robot. These systems and methods may be used in many other systems that use coordinated motion profiles, including a wide variety of robotic systems, such as pod-based robots (e.g., hexapod robots, tripod robots), packaging systems (e.g., food packaging system that uses a combination of robotic arms and movers 18), combination systems that use some robots and some movers 18, and the like.

Another example use of the reference array 42 is shown in FIG. 6. FIG. 6 is a diagrammatic representation (e.g., diagram 130) of another example reference array 42 structure and a graphical user interface (GUI) 132 associated with the reference array 42. FIG. 6 shows an example reference array 42 where multiple types of components may operate to execute a control operation (e.g., a palletizing operation), and thus may be associated together in a reference array 42 corresponding to the control operation. Indeed, the reference array 42 includes entries for palletizer devices (e.g., represented by identifier 134), for a sorter device (e.g., represented by identifier 136), and for a delta device (e.g., represented by identifier 138) may operate together for sorting and palletizing loads of the objects. For example, there may be fruit incoming on a conveyor and the palletizer devices, the sorter device, and the delta devices may operate according to one or more coordinated motion profiles to sort and palletize the fruit.

The reference array 42 may be defined for the "Fruit Sort Line" level and include two entries 44, one associated with the "Pallet Cell" (e.g., identified by identifier 140) and another associated with the "Sorter Cell" (e.g., identified by identifier 142). The two entries 44 may respectively store an indication of a storage address to direct the control system 30 as where to retrieve one or more entries associated with the "Pallet Cell" reference array 42 or with the "Sorter Cell" reference array 42. Indeed, the reference array 42 shown in FIG. 6 includes levels of indirection and thus each entry 44 may include redirecting storage addresses to guide the control system 30 to where each control parameter 60 is stored in the storage 62.

When navigating deeper into the reference array 42, taking the "Pallet Cell" reference array 42 as an example, the control system 30 may access another "Palletizer1" reference array 42 and "Palletizer 2" reference array 42 when accessing the storage address 64 stored in two entries of the "Pallet Cell" reference array 42. Each of the "Palletizer1" reference array 42 and the "Palletizer 2" reference array 42 may include entries 44 storing storage addresses 64 for each control parameter 60, such as "Pal2Axis1" through "Pal2Axis4" control parameters 60. These searching and/or accessing operations may be repeated to access any of the control parameters 60 for the components represented by the diagram 130. Describing this in a different way, the GUI 132 visualizes the hierarchy of the reference array 42, showing how certain entries 44 for the control parameters 60 may be nested under identifiers corresponding to its owning reference array 42.

To elaborate on further on programming components using the reference array 42, FIG. 7 is a flowchart of a method 154 for using a motion profile and a reference array 42 to program the linear motor system 10 to repeat performance of an operation represented by the motion profile. For ease of explanation, FIG. 7 is explained using components described above with reference to FIGS. 1-6. Although the method 154 is described below as being performed by the control system 30, it should be understood that any suitable control device, such as a local control device for one or more of the movers 18, or other control or processing circuitry. Moreover, although the following description of the method 154 is described in a particular order, it should be understood that the method 154 may be performed in other suitable orders.

At block 156, the control system 30 may receive an indication of a target operation for a system. As referred to herein, the system is the linear motor system 10 of FIG. 1, however it should be understood that the control system 30 may control any number and types of system. The target operation may correspond to a change in speed, direction, an adjusted movement pattern, or the like to change, stop, and/or start performance of an automation control operation. In some cases, an axis of motion related control parameter 60 may define a direction and distance for a mover 18 to travel. Since movement of the movers 18 is restricted to the track 12, the axis of motion may be specified as a forward direction or as a reverse direction. However, as one may appreciate, the axis of motions may span three dimensions, such as may be used in some robotic applications (e.g., a freely moving robotic arm at least described with FIGS. 4-6).

At block 158, the control system 30 may access a motion profile for the target operation received at block 156 based on the target operation and may access a reference array 42 for the linear motor system 10 to implement the target operation. The motion profile may define a timeline of operations and/or parameter 60 values to be implemented at one or more components of the linear motor system 10 to perform the target operation. The target operation may involve a one-time movement and/or repositioning of one or more components, and thus may be generally completed when a single instruction is transmitted (or implemented at the one or more components). However, in some cases, the target operation may involve more than one movement to complete the total target operation, and thus is completed over time (e.g., using a sequence of operations).

At block 160, the control system 30 may transmit a set point for storage at a storage address 64 indicated by the reference array 42 for a first component of the one or more components. The set point may be stored in storage 62 at the storage address 64 maintained by the reference array 42 in association with a parameter 60 characterizing one or more aspects of the first component. For example, the control system 30 may transmit a value for speed of a mover 18 as a set point to a portion of storage 62 corresponding to the storage address 64 for a speed parameter 60 of the mover 18 maintained by the reference array 42 corresponding to the linear motor system 10. Storage of the set point in the storage 62 may itself sometimes program the mover 18 to operate according to the value. In some cases, however, set points in storage 62 may be exported and/or programmed into the movers 18 at a same time to permit coordinated motion. In other cases, the movers 18 may be programmed one by one, or subset by subset, until each is programmed. When each mover 18 is programmed, the control system 30 may transmit a control signal to trigger the application of the set points to the behavior of the mover 18, thereby coordinating a change in operation of the mover 18.

Indeed, to do so, the control system 30 may, at block 162, determine whether the first component was the last component. The control system 30 may reference components represented with the reference array 42 to determine whether the first component was the last component indicated by the reference array 42. In some cases, the control system 30 may reference a count and a known size (e.g., length) of the reference array 42 when determining whether the first component was the last component (e.g., whether components remain for adjustment). To do so, the control system 30 may generally transmit the set point to a first entry of the reference array 42, and in response to transmitting the set point, increment an indication of a count. The control system 30 may, in response to incrementing the indication of the count, transmit the set point to a second entry of the reference array 42, and repeat doing so until the control system 30 determines that the count is greater than a size of the reference array.

Indeed, at block 162, when additional components remain to be programmed and the first component was not the last component, the control system 30 may continue, at block 158, to repeat access of a motion profile for the target operation and the remainder of the method 154 to continue to program each remaining component with set points indicated by the motion profile.

When, at block 162, the control system 30 determines that no further components are indicated by the reference array 42, and that the first component was the last component, the control system 30 may proceed, at block 164, to transmit a control signal to apply the set points programmed in the storage 62 to the components, thereby adjusting a current operation of the linear motor system 10 to the target operation indicated at block 156. Indeed, the control system 30 may prepare to program components, and when each component is programmed, transmit the control signal to program the components with the set points at block 164 to complete the deployment of the target operation to the linear motor system 10.

Keeping the forgoing in mind, the following further describes additional features and benefits related to reference arrays 42. Indeed, when configuring an operation of an industrial automation system using reference arrays 42, components of the industrial automation system may be associated with the reference arrays 42, such that each component may be updated or controlled using the data entries of the reference array 42. For example, when programming movers 18 of the linear motor system 10, the control system 30 may change values stored in association with entries of the reference array 42. The control system 30 may follow nested storage address 64 sequences to arrive at a storage location corresponding to a definition of a control parameter 60 when programming a mover 18 with a value for the control parameter 60.

In some cases, the control system 30 may use a single configuration command to reference multiple components associated in a same reference array 42. The single configuration command may cause the components to adjust their operations by being used to adjust values for control parameters 60 associated with the components.

Sometimes, the components may not be in a same physical system (e.g., sub-system, industrial unit) but may still be referenced by a same reference array 42. For example, the control system 30 may use a same reference array 42 to control movers 18 physically located on two separate tracks 12. This may improve, for example, status reporting from categories of devices within different systems since a same command may be used to reference entries 44 associated with a same reference array 42, thereby reducing a number of individual command operations and/or control signals used to access the status data. Although the case of similar types of components is discussed here, it should be understood that any combination of devices from any combination of systems may be associated together using one or more reference arrays 42 for improved control operations, reporting operations, or the like.

Reference array templates may be used when configuring a same control parameter 60 for multiple components, such as a same axis parameter for one or more axis definitions for a mover 18 or multiple movers 18. In this way, each mover 18 may be assigned the same axis definition using a single configuration command. This may represent an improvement in deployment of industrial automation systems since this type of "batch-programming" system may reduce a number of unique programming operations used by the control system 30 to deploy target point commands to the individual components relative to other control processes.

When a reference array 42 includes values as opposed to storage addresses or indirections to further reference arrays 42, the control system 30 may adjust a control parameter 60 attributed to one or more components associated with the reference array 42 by adjusting a value stored in one or more entries 44 corresponding to the one or more components. By adjusting a value stored in an entry 44 of the reference array 42 by some amount (e.g., adding three units to a value of an entry 44), the operation of multiple components of the industrial system may change based on the adjusted control parameter 60 if they refer to the same reference array 42. The control system 30 may send commands to multiple components in response to receiving an instruction to execute loop operations for each of its connected components based on the updated reference array 42.

Additionally or alternatively, the control system 30 may use control parameters 60 to set operations of the components associated with the reference array 42 as well as to obtain sensing data and/or other operational information associated with the components. For example, the component and/or a sensor related to the component may perform a sensing operation and store resulting sensing data at a storage location corresponding to the control parameter 60. Resulting sensing data may be obtained and/or identified based on a parsing operation (e.g., parsing) sensing data resulting from the sensing operation. Parsing operations may facilitate gathering and/or organization of sensed data to obtain data of a same data format, since, in some cases, sensing data may include data of one or more data formats.

In some cases, an emulation operation may be used by the control system 30 with reference to the reference array 42.

The control system 30 may use the emulation operation to iterate through each entry 44 of the reference array 42 to update data associated with the components. Indeed, the control system 30 may query a storage address 64 of the storage 62 to access one or more operational status, one or more sensing values, or the like indicated by the reference array 42 as being stored at the storage location. For example, the control system 30 operating to update a human machine interface (HMI) with many status for hundreds of objects in an industrial automation system, such as the linear motor system 10, may do so using the emulation operation to access references of the reference array 42 to objects corresponding to the various movers 18. The control system 30 may query storage for a value of a control parameter 60 associated with a status or current operation of a respective mover 18 and update a display with an indication of the value of the control parameter 60 before iterating through to a next mover 18 referenced by the reference array 42. It is noted that a command used to execute the emulation operation may be standardized between each reference array 42, thereby improving deployment by the control system 30. Standardization of the command may permit indexing to be performed to the reference array 42 to reduce complexity of access to status or value data.

Reference arrays 42 may be associated with add-on instructions (AOIs) (e.g., user-defined functions that incorporate use of the reference array 42) generated using selections received by the control system 30 via user inputs. AOIs may be functions generated in response to user interaction or selection with options presented via a GUI, such as design options for creation of an automation control operation. Indeed, AOIs may be defined to cause the control system 30 to update an HMI in a particular manner using defined combination of control parameters 60 (e.g., values, status). AOIs may be used to generate and/or to supplement a motion profile defining or indicative of a coordinated motion. A coordinated movement or motion may correspond to moving a platform, to lifting a component from a first height to a second height, to moving the component from a first location to a second location, to sorting an object, to palletizing an object, to displacing a load, to extending a robotic arm, to retracting the robotic arm, or to any other suitable operation associated with industrial environments. In some cases, an AOI may be generated to cooperate with certain status accessed using references to entries 44 of the reference array 42. For example, an entry 44 may correspond to a sensed value of distance from a first mover 18 to a second mover 18. The control system 30 may reference one or more AOIs and, in response to the sensed value being less than a threshold distance, may proceed to generate a deceleration control command to one of the movers 18. AOIs may be rules that, upon satisfaction of a condition of the rules (e.g., a value is greater than or equal to a threshold), causes application of an adjustment to one or more entries 44.

In some cases, a reference array 42 may be used with entries 44 capable of storing or indicating data, such as status data or sensing data, having different data types (e.g., data represented by different data protocols), such as status data, sensing data, or the like obtained from a variety of components. A first entry 44 may correspond to a first type of data format and a second entry 44 may correspond to a second type of data format. Types of data formats may include any suitable data type, such as floating point data, Boolean data, integer data, an integer with a defined cut off number of bits, a hexadecimal number, a binary number, an integer, or the like. The control system 30 may update an HMI with data referenced by the reference array 42 even if the entries 44 correspond to different data types. In some cases, the control system 30 may perform a data parsing and/or reformatting operation to reformat data from a first data protocol (e.g., data format) to a second data protocol. The control system 30 may use a uniform or common data protocol, where the control system 30 receives and transmits data of many formats but stores and processes data in a same protocol.

Data received by the control system 30 may correspond to current motion components to be used to determine how far off a current operation is from a set point or target motion component. The reference array 42 may be associated with a motion profile of a control operation. The motion profile may define set points to be implemented by local control systems of industrial automation components to implement the overall control operation. The control system 30 may analyze a difference between the target motion component (e.g., set point) and the current motion component to determine a control command to transmit to the local control system.

The control command may either directly instruct the change in operation of the industrial automation component, such as by instructing a particular change in operation by the industrial automation components (e.g., centralizing control operation determinations) and/or by instructing the local control system of the target set point. The local control system may implement incremental changes at the industrial automation component to achieve operation aligned with the target set point, thereby decentralizing control operation determinations from the control system 30 to each of the local control systems. In this way, a respective local control system may receive a first control command from one or more control commands generated by the control system 30 (e.g., based on the motion profile and/or reference array 42). Using the first control command as indicative of a set point, the local control system generate additional control commands to implement the set point in an operation of the industrial component over a duration of time, such as by incrementally increasing the velocity of a mover 18 over time.

Sometimes the control system 30 may use previously sensed data as motion components indicative of a current operation of the industrial devices being controlled using the reference array, such as sensed data obtained less than a threshold amount of time prior to a current time. Sensed data that is fresh enough (e.g., less than the threshold amount of time old, less than one hour old, less than one day old, etc.) may be generally indicative of a current operation, and thus may be used by the control system 30 to implement control operations.

Furthermore, in some cases, when the control system 30 references an entry 44 of the reference array 42, the reference to the entry 44 may provide the control system 30 access to the data stored at the storage address corresponding to the entry 44. Indeed, when referencing the entry 44, the reference to the entry 44 of the reference array 42 may generate a memory command to access the storage 62 and/or may reference a cache or similar listing of data included in the storage, further reducing a complexity of programming components referenced with the reference array 42. For example, when the control system 30 is establishing an HMI visualization, the control system 30 may link a graphic of the HMI visualization to an entry 44 of the reference array 42 without explicitly linking to the storage address 64 in the storage 62.

With the foregoing in mind, it should be understood that the reference array 42 may be interchangeably referenced by instructions. For example, a first motion-related instruction may use an axis object in a reference array 42 and through reference of the axis object in the reference array 42 may also reference nested references to the axis object with the same instruction. Nested references may relate to hierarchical levels of indirection, where a top-level or relatively higher level data object of a reference array 42 may include sub-references nested in association with the data object. Thus, when a data object that includes nested references is referenced via an instruction, the nested references are also accessed via the single instruction. Nest references may improve how a control system 30 deploys commands to components of an industrial automation system. For example, the control system 30 may command a whole unit to increase a temperature of a product being produced using the whole unit via a single instruction to a reference array including data objects for the whole unit. A control system 30 for a waste water treatment facility may reference components at a higher-level for the facility or may reference components at lower-levels for the facility using reference arrays defined for the waste water treatment facility. For example, the control system 30 may increase a level of chlorine added to a clean water output by transmitting a global command that refers to the reference array for operations of multiple units being employed by the wastewater treatment facility. In this way, the structure of the reference array may be used to disseminate local commands to various units that will be used to create the change to the chlorine level. As such, the global command may correspond to a process profile, such as one defined by a user to suitably be able to be applied to the wastewater treatment facility to increase a level of chlorine added to the clean water output. The global command may be accessed via a list of defined commands shipped with applications supporting use of reference arrays and/or via a list of user-defined commands.

In cases when association between the storage address 64 and the entry 44 is to change, indirectly referencing storage addresses 64 may provide immense benefit associated with reduced complexity to perform the change. For example, indirect links to the storage address 64 made through linkage to the entry 44 of the reference array 42 may not be updated since the references to the entry 44 remain unchanged. Indeed, changes to the association between the storage address 64 and the entry 44 may demand changes in direct references to the storage address 64 associated with the component of the entry 44 without changing indirect references to the storage address 64 made using the entry 44.

The above-described systems may also improve device replacement operations, such as by reducing time spent redirecting references to replacement devices or otherwise changed devices. The reference array 42 including an object corresponding to the device may automatically update communicative links to the device when the device underlying to the reference array 42 is changed. For example, a reference array 42 may include a data entry 44 for a mover 18. Certain industrial automation system components and/or control functions may reference the reference array 42 and the data entry 44 to access the mover 18 during operation. When the mover 18 is replaced, the data entry 44 is updated. Thus, any indirect reference to the data entry 44 via the reference array 42 may be automatically updated to reference the replaced mover 18 without an operator or the control system 30 individually reprogram each reference to the replaced mover 18.

Furthermore, the control system 30 may adjust (e.g., edit) a structure of the reference array 42 or of an object of the reference array 42 using array extension or array adjustment operations. Indeed, the object may include a nested reference array 42 or other logical device referenced by the reference array 42 that is to be adjusted in response to a change in a hardware or a software of the component corresponding to the object. For example, when software and/or hardware of a mover 18 is updated, the control system 30 may update the object corresponding to the mover 18 (e.g., nested reference array 42 or a reference array 42 referenced by a reference array 42 for the linear motor system 10 including the mover 18, logical device) to add or remove a reference to a control parameter 60 to mirror the change made to the software and/or hardware of the mover 18. To adjust the reference array 42 in response to the added control parameter 60, the control system 30 may update the reference array 42 for the mover 18 to include an entry 44 for an added control parameter 60 in the object of the mover 18 and may leave other entries for other control parameters 60 untouched (e.g., unadjusted), thereby preserving previous functionalities of the mover 18.

In addition to the embodiments described above, it is noted that a control system 30 that uses reference arrays 42 to control one or more operations of an industrial automation system and/or to control visualization of one or more aspects of one or more operations of an industrial automation system may be vast in its applicability to systems. For example, control systems 30 using reference arrays 42 may apply to food manufacturing systems, refining systems, packaging systems, distribution systems, automobile systems, or the like. These systems and methods may apply to food handling operations as well as wastewater applications. Certain consumer electronic control systems may also benefit from the ability to batch reference groups of components within its corresponding computing device via one or more reference arrays 42. Indeed, process control operations may also be improved by used of a control system 30 using one or more reference arrays 42, for example, a batch coil annealing process with several furnaces each referenceable in different levels of indirection within reference arrays 42 managed by its control system 30. Indeed, these processes may use the reference arrays 42 to coordinate operations at various stages or parts of the process by controlling various devices at each respective stage or part using a respective set of devices.

Furthermore, the reference arrays 42 may apply to motion-related processes and/or stationary or motion-less processes. Entries 44 of reference arrays 42 may correspond to motion-related parameters (e.g., axis, speed, velocity, orientation, position, height from reference axis, rotation), sensed value-related parameters (e.g., voltage and/or current values, power-related values, torque values, temperature values, pressure values, audio values, light values, or other values derived from a sensing operation), and/or to status-related parameters (e.g., open, closed, light on, light off, light blinking, red light, green light, blue light, high level alarm, alarm on, alarm off, trip, on, off), or the like. Indeed, movable components may be represented via one or more entries 44, however other components may also be represented via the one or more entries 44, including status lights, circuit breakers, motor drives, alarms, or the like. The entries 44 may correspond to coordinate systems, messages, equipment phases, input/output modules, equipment identifier tags, or the like. Indeed, many if not all components used in an industrial automation system may be able to be partially or wholly represented via entries 44 of one or more reference arrays 42.

It is further noted that the reference array 42 may include one or more row of entries 44, one or more column of entries 44, or a combination thereof. Columns of entries 44 may correspond to different types of entries 44 (e.g., entries with different attributes, entries with same attributes but different values at different times). In the example of a motion profile, the motion profile may be associated with programming values of different entries 44 over time, where at a first time of the motion profile a first set of entries having a first set of attributes and first set of values, and at a second time of the motion profile a second set of entries may have the first set of attributes and a second set of values corresponding to a next motion increment toward a desired motion and/or position (represented via the motion profile). A motion profile that includes entries that remain constant (e.g., do not change over time) may be thought of as a control profile (e.g., a control profile that specifies a snapshot of motion profile), but may be applied and/or referenced in a similar way as the motion profile.

Referring back to levels of indirection, a reference array that includes, as entries, values that redirect to additional reference arrays may be referred to as a reference structure. In addition to reference arrays, the reference structure may also include a reference to a structured data set. For example, a reference structure may be a cell descriptor that includes four reference arrays and one structured data set. A first reference array in this example may include one or more entries, where each entry respectively corresponds to a respective phase (e.g., [Phase 1], [Phase 2], [Phase 3], [Phase 4], [Phase 5]). A second reference array in this example may include one or more entries, where each entry respectively corresponds to a respective mover (e.g., [Mover 1], [Mover 2], [Mover 3], [Mover 4], [Mover 5]). A third reference array in this example may include one or more entries, where each entry respectively corresponds to a respective message (e.g., [Message 1], [Message 2], [Message 3], [Message 4], [Message 5]). A fourth reference array in this example may include one or more entries, where each entry respectively corresponds to a respective alarm (e.g., [Alarm 1], [Alarm 2], [Alarm 3], [Alarm 4], [Alarm 5]). As for the structured data set, the structured data set may include five entries each corresponding to a different data type and size (e.g., [Integer 8], [Float 11], [User-defined type (UDT) 3], [Boolean 6], [Data and/or Time data 14]). Each of the reference arrays may include a reference to a nested reference array corresponding to that component. For example, the entry of the second reference array for the fourth mover (e.g., [Mover 4]) may store a storage address for a first entry of a fifth reference array associated with the fourth mover. Similar, the entry of the fourth reference array for the first alarm (e.g., [Alarm 1]) may include a reference to another nested reference array corresponding to that alarm. Indeed, the entry for the first alarm may reference to a storage address for a first entry of a sixth reference array associated with the first alarm (e.g., a reference array that includes entries for each mover of the second reference array that store a current status of each respective alarm designated as the first alarm of each mover). These nested reference array operations and/or hierarchies are not to be taken as limited to just these combinations. Indeed, any number of nested reference arrays and/or structured data sets may be used to organize an industrial automation system into units, plant sectors, operational components or portions, system-level portions, component-level portions, or the like.

The reference structure described above may be used externally by the control system 30 using batch commands to command and/or interact with the phases of the first reference array. The phases may refer to phases of manufacturing. Thus, batch commands may include START (e.g., start operations associated with the phase of manufacturing), STOP (e.g., stop operations associated with the phase of manufacturing), HOLD (e.g., to pause operations associated with the phase of manufacturing), or the like. Indeed, any command associated with a phase of manufacturing may be used. It is noted that when using a batch command, the batch command may cause reference of a motion profile (or a control profile if the command is not implemented over time) to implement the batch command. The motion profile may include one or more operational commands and/or status commands to refer to when setting values of entries of components over time to implement the batch command.

Taking the case of the STOP batch command, in some cases, a phase of manufacturing may not be desired to be abruptly stopped at will. Certain systems and/or portions of a manufacturing process may be shut down incrementally and/or according to a defined sequence of operations, such as in accordance with operational protocols. Furthermore, some systems may be electrically locked-out, tagged-out as part of the STOP batch command. The motion profile enables implementation of these customized batch commands by enabling component-specific operations relative to other component-specific operations to be implemented over defined time intervals. For example, to STOP a phase of a refining process, first a motor may be slowly reduced to zero, then the driver of the motor may be powered off, and these may be performed in parallel to a product upstream being stopped from flowing to a first component associated with the phase of the refining process. Without applying the STOP batch command to the first phase entry of the first reference array of the above-example, a control system 30 may generate respective commands to implement this described interconnected shutdown process (e.g., STOP). However, by applying the STOP batch command to the first phase entry of the first reference array of the above-example, a control system 30 may generate control signals according to a defined motion profile for the specific process. Furthermore, by applying the STOP batch command to the second phase entry of the first reference array of the above-example, a control system 30 may generate control signals according to the defined motion profile that has been adjusted for the components encompassed (e.g., represented by) the second phase entry of the first reference array based on that for the first phase, improving how (e.g., an efficiency of) the control system 30 generates these commands. Improvements in control system operation may use fewer processing resources and consume less power overall, thereby improving operations of an industrial automation system by reducing net amounts of power consumption and/or by reducing net amounts of processing consumed.

Using the same reference structure example, a monitoring system may reference the third reference array to determine a number of message records passed on to a manufacturing execution system (MES) (e.g., a system used to track manufacturing of raw materials in to products) and/or a count stored in each entry corresponding to respective message types transmitted from the monitored system (e.g., count stored in entry of [Message 1]). This may be used, for example, to debug system performances based on counts of messages maintained at the control system 30, among other uses. Furthermore, a computing device executing and/or displaying a human machine interface (HMI) may interact with the reference structure to view which alarms identified via the fourth reference array are active and/or to acknowledge the alarms (e.g., one by one via entries of nested reference arrays, collectively via entry). The computing device may also monitor activity (e.g., changes in value of respective entries) of each entry of each reference array and/or nested reference array via one request for the set of data (e.g., reference to entire reference structure). The returned reference structure dataset may be used to update graphics rendered via the HMI to reflect any updates in operations (e.g., changes in values of entries). Indeed, the single reference to the reference structure may be used efficiently via application programming to access any of the references and/or entries via a series of indirections to eventually resolve to the actual object or data associated with the actual object.

As another example, a wastewater treatment process may use a wastewater treatment industrial system and a sludge treatment industrial system to produce potable water. These systems may be organized based on hierarchical levels with a reference structure to improve control of the systems. Indeed, the wastewater treatment industrial system and the sludge treatment industrial system may correspond to reference arrays associated together in a reference structure. At a first level of the reference structure, entries of first reference array may correspond to each of the systems (e.g., first entry corresponding to the wastewater treatment industrial system, second entry corresponding to the sludge treatment industrial system). The entries of the first level may redirect to a second level of the reference structure corresponding to sections of each system. For example, the wastewater treatment industrial system may be able to be divided into several sections of the facility, such as intake, preliminary treatment, primary treatment, membrane treatment, disinfection, and output, though other sections may be used. The same applies to the sludge treatment industrial system, though different sections may be used.

If a control system 30 is following the wastewater treatment industrial system portion of the reference structure to resolve, the control system 30 may access entries corresponding to each of the different sections (e.g., [intake], [primary clarifier], [secondary clarifier], [disinfection], and [output]) within the reference array at the second level of the reference structure. Each entry of the second level of the reference structure may reference to another reference array associated with that particular section (at a third level of the reference structure). For example, each entry may reference to a third level of the reference structure associated with operational areas within each section. Taking the entry for the intake section as an example, when following the intake section to resolve, the entry may redirect to another reference array (at a fourth level of the reference structure) that includes an entry for each area within the intake section, such as a public channel network area, a storm water basin area, a pump station area, a fecal station area, a bar screen area, and a grease and grit removal area. Each of those areas may correspond to units within the areas, and each of the units may include devices to perform a sub-operation of the unit.

Thus, similar to the upper-levels of the reference structure, the units may correspond to lower levels of nested reference arrays to drill further into details regarding devices of each unit, components of each device, and eventually statues, operational states, set points, and the like for each sub-component of each device. A sample path through the reference structure to resolve at a component may involve an entry sequence of [wastewater treatment industrial system]-[intake]-[public channel network area]-[input valve 1]-[pump driver]-[on/off status]. This entry sequence (e.g., path to resolve) may be used by control systems 30 to generate graphics of piping and instrumentation diagrams (P&ID) that model, in real-time, current states and values associated with operation of the systems. The P&ID diagram may visualize through selective highlighting or graying of color schemes of the visualization which phases of manufacturing are being performed. It is noted that a control system 30 commanding operation to transition to a first phase of manufacturing may do so via a highest level command to the first level of entries or to the entire reference structure. Since phase commands may be implemented through implementation of a motion profile representative of the phase operation, a single start command may be used to trigger application of the motion profile to the systems. Indeed, the batch commands described above may be used by a control system 30 to control one or more components of the wastewater treatment industrial system and/or the sludge treatment industrial system at any level of granularity and/or to access any recordable data tracked via the reference structure for the component.

Thus, technical effects of the present disclosure include techniques for indirectly referencing data stored in storage addresses using references to entries of reference arrays. A reference array may provide a structure through which to organize components in an industrial automation system for relatively streamlined programming, control, and/or access operations. For example, references made to a reference array for a system may provide access to deploy a motion profile and/or stored control operation using a single command (or a relatively fewer number of commands compared to other methods) to deploy the changes in configurations. Indeed, reference arrays may enable copying of a system configuration from a first system to another system relatively straightforward since components associated with the reference array may be indexed and looped to perform the copying. Indeed, these systems and methods described herein may permit drag and drop style configurations when used in combination with HMI visualizations compatible with a drag and drop development of reference arrays. When, entries of the reference array are of a same type, control system operation may improve since a single control command may be used to apply a configuration change to many entries (e.g., applying a same increase in axis of motion value for multiple movers grouped in a same reference array) as opposed to using a control command for each mover. Furthermore, maintenance of graphics rendered in an HMI (e.g., process to keep information fresh) and/or status reporting operations may improve since processes of defining a record for a smart tag, trend monitoring, or data acquisition, processes for retargeting of a link between storage and the reference array (e.g., retarget of an alias associated with an entry), or the like may reduce in complexity.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:
1. A system, comprising:
 a plurality of industrial components configured to move in one or more directions in an industrial environment; and
 a control system configured to:

receive a request to perform a control operation to implement using the plurality of industrial components;

access a reference array associated with performing the control operation using the plurality of industrial components, wherein the reference array comprises a plurality of rows and a plurality of columns, wherein each row of the plurality of rows corresponds to a respective industrial component of the plurality of industrial components, and wherein each column of the plurality of columns corresponds to a respective motion component of a motion profile for the control operation;

identify a plurality of set points in the reference array associated with completing the control operation;

detect a plurality of current motion components of the plurality of industrial components;

generate a plurality of control commands for the plurality of industrial components based on the plurality of current motion components, the plurality of set points, and the reference array; and send the plurality of control commands to the plurality of industrial components, wherein the plurality of industrial components is configured to perform the control operation in response to receiving the plurality of control commands.

2. The system of claim 1, wherein the plurality of industrial components comprises a plurality of movers disposed on a track and movable along a surface of the track.

3. The system of claim 1, wherein each of the plurality of industrial components comprises additional respective control systems configured to receive at least a portion of the plurality of control commands.

4. The system of claim 1, wherein the plurality of current motion components comprises value defining a speed, an acceleration, a velocity, a position, or any combination thereof.

5. The system of claim 1, wherein the control system is configured to:

identify a first plurality of entries in the reference array based on the plurality of current motion components;

determine a count between the first plurality of entries and a second plurality of entries corresponding to the plurality of set points;

increment a counter to determine a count value, wherein the count value corresponds to one column of the plurality of columns;

generate a portion of the plurality of control commands based on the count value and the reference array; and send the portion of the plurality of control commands to the plurality of industrial components.

6. The system of claim 5, comprising:

incrementing the counter to generate an updated count value;

generate an additional portion of the plurality of control commands based on the updated count value and the reference array; and send the additional portion of the plurality of control commands to the plurality of industrial components.

7. The system of claim 1, wherein the motion profile defines a movement corresponding to moving a platform, to lifting a component from a first height to a second height, to moving the component from a first location to a second location, to sorting an object, to palletizing an object, to displacing a load, to extending a robotic arm, to retracting the robotic arm, or any combination thereof, to perform the control operation.

8. The system of claim 1, wherein the plurality of industrial components comprises a plurality of hexapod robots each having a platform upon which to carry a load.

9. The system of claim 1, wherein the control system is configured to detect the plurality of current motion components based on sensing data indicative of a previous operation of the plurality of industrial components.

10. A method, comprising:

receiving a request to perform a control operation to implement using a plurality of industrial components;

accessing a reference array associated with performing the control operation using the plurality of industrial components, wherein the reference array comprises a plurality of rows and a plurality of columns, wherein each row of the plurality of rows corresponds to a respective industrial component of the plurality of industrial components, and wherein each column of the plurality of columns corresponds to a respective component of a profile for the control operation;

identifying a plurality of set points in the reference array associated with completing the control operation;

detecting a plurality of current components of the plurality of industrial components;

generating a plurality of control commands for the plurality of industrial components based on the plurality of current components, the plurality of set points, and the reference array; and sending the plurality of control commands to the plurality of industrial components, wherein the plurality of industrial components is configured to perform the control operation in response to receiving the plurality of control commands.

11. The method of claim 10, comprising sensing a plurality of current motion components to detect the plurality of current components, wherein sensing the plurality of current motion components is based on sensing data indicative of a current operation of the plurality of industrial components, wherein the plurality of industrial components are configured to move in one or more directions in an industrial environment.

12. The method of claim 11, comprising parsing the sensing data to obtain data of a same data format, wherein the sensing data comprises a data having a plurality of data formats.

13. The method of claim 10, wherein generating the plurality of control commands for the plurality of industrial components comprises:

generating a first control command for a first industrial component comprising a hydraulic arm; and generating a second control command for a second industrial component comprising a conveyor; and sending the first control command and the second control command to cause performance of a palletizing operation.

14. The method of claim 10, comprising:

accessing an additional reference array comprising one or more statuses of one or more of the plurality of industrial components; and generating a graphical user interface based on the one or more statuses to present a visualization of the one or more statuses, or storing the one or more statuses in storage, or both.

15. One or more tangible, non-transitory, computer-readable storage media comprising executable instructions that, when executed by one or more processors, cause the one or more processors to:

receive a request to perform a control operation to implement using a plurality of industrial components configured to move in one or more directions in an industrial environment;

access a reference array associated with performing the control operation using the plurality of industrial components, wherein the reference array comprises a plurality of rows and a plurality of columns, wherein each row of the plurality of rows corresponds to a respective industrial component of the plurality of industrial components, and wherein each column of the plurality of columns corresponds to a respective motion component of a motion profile for the control operation;

identify a plurality of set points in the reference array associated with completing the control operation;

detect a plurality of current motion components of the plurality of industrial components;

generate a plurality of control commands for the plurality of industrial components based on the plurality of current motion components, the plurality of set points, and the reference array; and send the plurality of control commands to the plurality of industrial components, wherein the plurality of industrial components is configured to perform the control operation in response to receiving the plurality of control commands.

16. The one or more tangible, non-transitory, computer-readable storage media of claim 15, comprising additional instructions that cause the one or more processors to:

identify a first plurality of entries in the reference array based on the plurality of current motion components;

determine a count between the first plurality of entries and a second plurality of entries corresponding to the plurality of set points;

increment a counter to determine a count value, wherein the count value corresponds to one column of the plurality of columns;

generate a portion of the plurality of control commands based on the count value and the reference array; and send the portion of the plurality of control commands to the plurality of industrial components.

17. The one or more tangible, non-transitory, computer-readable storage media of claim 16, wherein detecting the plurality of current motion components comprises:

accessing a first nested reference array corresponding to a first industrial component of the plurality of industrial components using an indication from the reference array;

generating a control signal based on the reference array to cause a sensor to sense a subset of the plurality of current motion components;

transmitting the control signal to the sensor; and updating a value stored in the first nested reference array, wherein the value stored in the first nested reference array indicates a current motion component for the first industrial component sensed in response to the sensor receiving the control signal.

18. The one or more tangible, non-transitory, computer-readable storage media of claim 16, wherein an industrial component of the plurality of industrial components comprises a control system configured to:

receive a first control command of the plurality of control commands; and generate an additional plurality of control commands based on the first control command, wherein each of the additional plurality of control commands is configured to implementing a set point in an operation of the industrial component over a duration of time.

19. The one or more tangible, non-transitory, computer-readable storage media of claim 16, wherein the plurality of current motion components comprise floating point data, Boolean data, integer data, an integer with a defined cut off number of bits, a hexadecimal number, a binary number, an integer, or any combination thereof.

20. The one or more tangible, non-transitory, computer-readable storage media of claim 16, wherein the motion profile defines a movement corresponding to moving a platform, to lifting a component from a first height to a second height, to moving the component from a first location to a second location, to sorting an object, to palletizing an object, to displacing a load, to extending a robotic arm, to retracting the robotic arm, or any combination thereof, to perform the control operation.

* * * * *